May 5, 1925.
T. J. O'LEARY
BRAKE EXTENSION
Filed Nov. 2, 1923
1,536,966
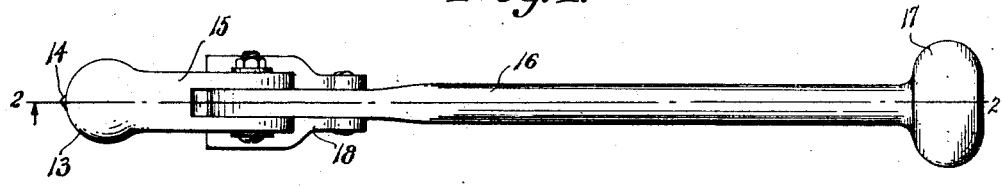
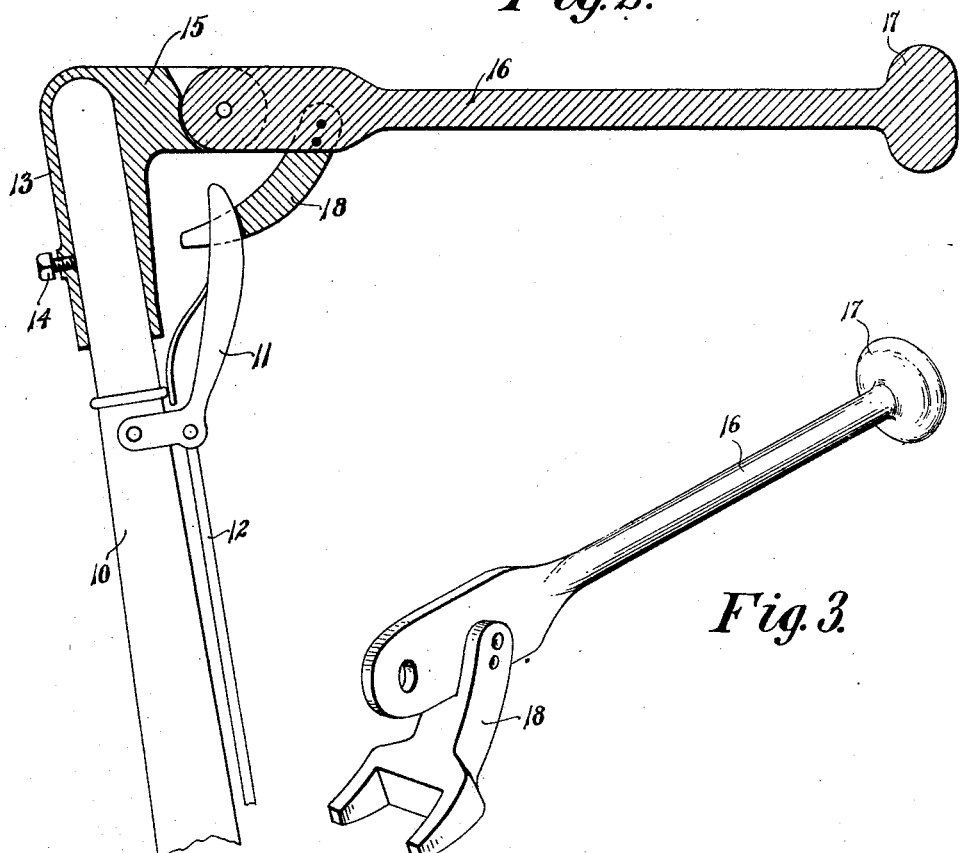
T. J. O'Leary.
INVENTOR Patented May 5, 1925.

1,536,966

UNITED STATES PATENT OFFICE.

THOMAS J. O'LEARY, OF ST. PAUL, MINNESOTA.

BRAKE EXTENSION.

Application filed November 2, 1923. Serial No. 672,385.

*To all whom it may concern:*

Be it known that I, THOMAS J. O'LEARY, a citizen of the United States, residing at St. Paul in the county of Ramsey and State of Minnesota, have invented new and useful Improvements in Brake Extensions, of which the following is a specification.

It is the purpose of this invention to provide an extension for an emergency brake lever of an automobile, so that the lever can be more conveniently and quickly actuated when its use is desired.

The invention is in the nature of an attachment for said lever and designed to permit of its application to or removal from the lever when desired.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein:

Figure 1 is a fragmentary view of an emergency brake lever showing the manner of attaching the invention thereto.

Figure 2 is a sectional view taken on the line 2—2 of Figure 1.

Figure 3 is a detail view of the extension rod and yoke.

While the invention is as hereinabove stated primarily intended for use on emergency brake levers of motor operated vehicles, I desire to have it understood that it can be used with other control levers for mechanical movements of any sort whatsoever, and that its general application is contemplated by the claims.

As shown in this specific instance, the brake lever is indicated at 10, and has pivoted thereon the usual release element 11 by serving to actuate the pawl retracting rod 12. The attachment forming the subject matter of this invention embodies a sleeve like member 13 designed to be slipped over the upper end of the lever 10 and held fixed relatively thereto by means of a threaded element 14 in the manner clearly illustrated in Figure 2. The upper end of this sleeve like member is formed with a lateral projection 15 bifurcated to accommodate the adjacent end of the extension of the rod 16, the latter being pivotally mounted upon the projection 15. The rod 16 is horizontally disposed and terminates to provide an enlarged knob 17 arranged within convenient reach of the driver so that the brake control lever can be conveniently and quickly manipulated as the occasion may require. Depending from the extension rod 16 at a point adjacent its pivotal connection with the extension 15 is a yoke 18, this yoke embracing the release element 11 and associated therewith in a manner to support the extension rod in its normal position, and at the same time operate the element 11 to effect a release of the brake when pressure is exerted upon the extension rod 16. It is of course to be understood that the dimensions of the component parts can be varied to enable the attachment in its entirety to accommodate itself to control levers of different shapes and sizes without departing from the spirit of the invention. Furthermore the attachment is made up of very few parts, which can be cheaply manufactured and sold at a nominal cost, and used with little or no possibility of injuring the attachment in any way whatsoever.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. The combination with a brake control lever including a pivotally mounted release element, of an extension attachment comprising a sleeve like member adapted to be slipped over the upper end of the lever, a threaded element carried by the sleeve and adapted to engage said lever to hold the parts fixed relatively, a projection on said sleeve, an extension rod pivoted on said projection and arranged substantially at a right angle to said lever, and a yoke depending from said rod and embracing said release element, to support the rod in its normal position and to actuate the release element when pressure is exerted upon the rod.

2. An attachment for control levers having pivoted release elements, comprising a socket adapted to receive one end of the lever, an extension bar pivoted thereto and normally disposed in a horizontal plane, and a Y-shaped yoke carried by the extension bar and embracing the pivoted release element and adapted to hold the extension rod in a horizontal position and also actuate the pivoted release element upon rocking the extension rod.

In testimony whereof I affix my signature.

THOMAS J. O'LEARY.